United States Patent
Ogata et al.

(10) Patent No.: US 8,517,871 B2
(45) Date of Patent: Aug. 27, 2013

(54) VEHICULAR BELT-DRIVEN CONTINUOUSLY VARIABLE TRANSMISSION AND CONTROL METHOD THEREOF

(75) Inventors: Yusuke Ogata, Toyota (JP); Yoshinobu Soga, Toyota (JP); Ryoji Habuchi, Okazaki (JP); Hideki Yasue, Toyota (JP); Hirofumi Nakada, Toyota (JP)

(73) Assignee: Toyota Jidosha Kabushiki Kaisha, Toyota-shi, Aici-ken (JP)

( * ) Notice: Subject to any disclaimer, the term of this patent is extended or adjusted under 35 U.S.C. 154(b) by 789 days.

(21) Appl. No.: 12/307,588

(22) PCT Filed: Jun. 20, 2007

(86) PCT No.: PCT/IB2007/002777
§ 371 (c)(1),
(2), (4) Date: Jan. 6, 2009

(87) PCT Pub. No.: WO2008/007220
PCT Pub. Date: Jan. 17, 2008

(65) Prior Publication Data
US 2009/0286633 A1   Nov. 19, 2009

(30) Foreign Application Priority Data
Jul. 7, 2006  (JP) .................................. 2006-188018

(51) Int. Cl.
*F16H 61/06*    (2006.01)
(52) U.S. Cl.
USPC ............................................. 474/28; 474/18

(58) Field of Classification Search
USPC ............... 474/11, 18, 28, 13, 45–50; 701/51, 701/53, 54
See application file for complete search history.

(56) References Cited

U.S. PATENT DOCUMENTS

| | | | |
|---|---|---|---|
| 4,628,773 A * | 12/1986 | Itoh et al. | 474/28 |
| 5,259,272 A * | 11/1993 | Yamamoto et al. | 477/45 |
| 5,766,105 A * | 6/1998 | Fellows et al. | 474/18 |
| 6,099,424 A * | 8/2000 | Tsai et al. | 474/12 |
| 6,179,739 B1 * | 1/2001 | Tsai et al. | 474/12 |

(Continued)

FOREIGN PATENT DOCUMENTS

| | | |
|---|---|---|
| EP | 0 892 196 A3 | 1/1999 |
| EP | 1 167 839 A1 | 1/2002 |

(Continued)

OTHER PUBLICATIONS

Notification of Reasons for Refusal for JP Appl. No. 2006-188018 dated Apr. 30, 2008.

(Continued)

*Primary Examiner* — William A Rivera
(74) *Attorney, Agent, or Firm* — Finnegan, Henderson, Farabow, Garrett & Dunner, LLP (57) ABSTRACT

In a vehicular belt-driven continuously variable transmission, belt squeezing force is inhibited from becoming excessive and a safety factor, with respect to belt slip, of belt squeezing force applied to a transmission belt (48) is reduced to a value that is less than or equal to 1.5 by reducing a pressure receiving area ($S_{OUT}$) of an output side hydraulic cylinder (46c). As a result, a centrifugal hydraulic pressure canceller chamber on a secondary pulley side (46) can be eliminated thus simplifying the structure of the vehicular belt-driven continuously variable transmission, while belt squeezing force can be appropriately controlled.

8 Claims, 7 Drawing Sheets

(56) References Cited

U.S. PATENT DOCUMENTS

| | | | |
|---|---|---|---|
| 6,290,620 B1 * | 9/2001 | Tsai et al. | 474/18 |
| 6,612,949 B2 * | 9/2003 | Pelders et al. | 477/46 |
| 6,824,483 B1 * | 11/2004 | Van Der Laan et al. | 474/28 |
| 2006/0058129 A1 | 3/2006 | Kim et al. | |
| 2006/0194671 A1 * | 8/2006 | Katou | 477/46 |
| 2008/0004153 A1 | 1/2008 | Reuschel | |

FOREIGN PATENT DOCUMENTS

| | | |
|---|---|---|
| EP | 1 403 565 A3 | 3/2004 |
| JP | 02-212657 | 8/1990 |
| JP | 2001-012590 | 1/2001 |
| JP | 2005-90719 | 4/2005 |
| WO | WO 2006/063548 A1 | 6/2006 |

OTHER PUBLICATIONS

Notification of Reasons for Refusal for JP Appl. No. 2006-188018 dated Sep. 24, 2008.

* cited by examiner

|  | C1 CLUTCH | B1 BRAKE |
|---|---|---|
| FORWARD | ○ |  |
| REVERSE |  | ○ |

○ : ENGAGED

FIG. 3

BELT-DRIVEN CONTINUOUSLY VARIABLE TRANSMISSION 30

| VEHICLE | CONTINUOUSLY VARIABLE TRANSMITTING PORTION SPECIFICATIONS | | | | | | | VEHICLE SPECIFICATIONS | |
|---|---|---|---|---|---|---|---|---|---|
| | HYDRAULIC PRESSURE CIRCUIT | | | Sec CYLINDER SPECIFICATIONS | | | BELT SPECIFI-CATIONS | | |
| | INDICATED PRESSURE WHEN RUNNING AT MAXIMUM SPEED | MINIMUM CONTROLLABLE PRESSURE | SAFETY FACTOR AT MINIMUM PRESSURE | OUTER DIAMETER | INNER DIAMETER | PRESSURE RECEIVING AREA | CENTRIFUGAL HYDRAULIC PRESSURE COEFFICIENT WITH NO CANCELLER | WINDING DIAMETER | TORQUE | MAXIMUM VEHICLE SPEED |
| | [MPa] | [MPa] | [-] | [mm] | [mm] | [cm²] | [MPa/(km/h)²] | [mm] | [Nm] | [km/h] |
| VEHICLE OF THIS EXAMPLE EMBODIMENT | 0.327 | 0.2 | 1.18 | 132.9 | 47.0 | 121.4 | 1.12E-08 | 129.3 | 161.5 | 209.6 |

VEHICULAR BELT-DRIVEN CONTINUOUSLY VARIABLE TRANSMISSION AND CONTROL METHOD THEREOF

CROSS-REFERENCE TO RELATED APPLICATIONS

This application is a national phase application of International Application No. PCT/IB2007/002777, filed Jun. 20, 2007, and claims the priority of Japanese Application No. 2006-188018, filed Jul. 7, 2006, the contents of both of which are incorporated herein by reference.

BACKGROUND OF THE INVENTION

1. Field of the Invention

The invention relates to a structure and control method of a vehicular belt-driven continuously variable transmission. More particularly, the invention relates to the structure and control method of a vehicular belt-driven continuously variable transmission that eliminates a centrifugal hydraulic pressure canceller chamber of a secondary side cylinder.

2. Description of the Related Art

One known type of vehicular transmission is a belt-driven continuously variable transmission that shifts speeds smoothly and continuously without any gear switching. This belt-driven continuously variable transmission is formed of a continuously variable transmitting portion that mainly includes two rotating members arranged parallel to one another, a primary pulley provided on one of the rotating members so as not to be able to rotate relative to that rotating member, a secondary pulley provided on the other rotating member so as not to be able to rotate relative to that rotating member, and a belt that is wound around the two pulleys. The primary pulley and the secondary pulley each include a fixed sheave and a movable sheave, with a V-shaped groove in which the belt sits formed between the two. Power is transferred between the two pulleys via the belt. Here, a primary side cylinder, which applies thrust for moving the movable sheave of the primary pulley in the axial direction, is provided on the primary pulley, while a secondary side cylinder, which applies thrust for moving the movable sheave of the secondary pulley in the axial direction, is provided on the secondary pulley. By individually controlling the hydraulic pressure supplied to the primary side cylinder and the secondary side cylinder, the speed ratio of the belt-driven continuously variable transmission is changed by controlling the groove width of the primary pulley and changing the winding diameter of the belt around that pulley, while belt tension is controlled by changing the groove width of the secondary pulley.

In this kind of belt-driven continuously variable transmission, when rotation from a power source such as an engine is input to a continuously variable transmitting portion without a reduction in speed while the vehicle is traveling forward, the rotational speed of the secondary pulley increases, and as it does so, relatively large centrifugal hydraulic pressure is generated within the secondary side cylinder. This centrifugal hydraulic pressure applies thrust to the movable sheave of the secondary pulley in a direction that squeezes the belt such that the belt squeezing force becomes excessive. Because of this, one related belt-driven continuously variable transmission is provided with a centrifugal hydraulic pressure canceller chamber on the secondary pulley side to cancel out the centrifugal hydraulic pressure.

Figure 6:
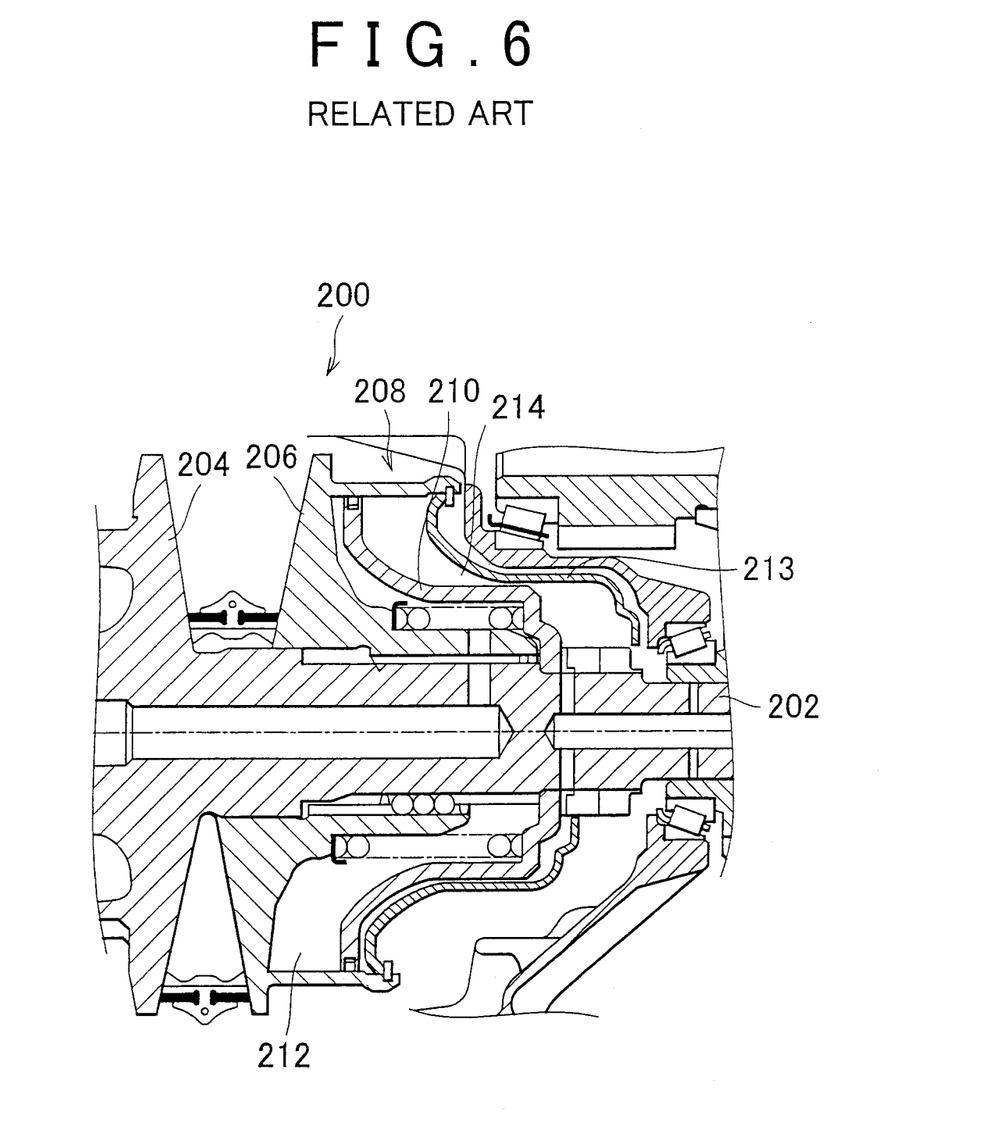
FIG. 6 is a sectional view of a secondary pulley which is a constituent member of a related belt-driven continuously variable transmission.

FIG. 6 is a sectional view of a secondary pulley 200, which is a constituent member of the foregoing related belt-driven continuously variable transmission. The secondary pulley 200 includes a fixed sheave 204 integrally provided on an output shaft 202, a movable sheave 206 fitted onto the output shaft 202 so as to be able to move in the axial direction but not rotate relative to that output shaft 202, and a secondary side cylinder 208 provided adjacent to the movable sheave 206. The secondary side cylinder 208 has a hydraulic pressure chamber 212 formed by the movable sheave 206 and a partition 210, and a centrifugal hydraulic pressure canceller chamber 214 formed between the partition 210 and a peripheral wall 213 that is fixed to the movable sheave 206. That is, the centrifugal hydraulic pressure canceller chamber 214 is formed on the opposite side of the partition 210 from the pressure chamber 212. By providing the centrifugal hydraulic pressure canceller chamber 214, a centrifugal hydraulic pressure equal to that in the hydraulic pressure chamber 212 is generated in the centrifugal hydraulic pressure canceller chamber 214 against the thrust on the movable sheave 206 toward the fixed sheave 204 which is generated by the centrifugal hydraulic pressure that is generated as the hydraulic pressure chamber 212 rotates. The centrifugal hydraulic pressure generated in this centrifugal hydraulic pressure canceller chamber 214 suppresses the effect of the centrifugal hydraulic pressure generated in the hydraulic pressure chamber 212 by applying thrust to the movable sheave 206 which is in the opposite direction as the thrust generated by the centrifugal hydraulic pressure in the hydraulic pressure chamber 212.

Providing this centrifugal hydraulic pressure canceller chamber however makes the continuously variable transmitting portion heavier, less compact, and more expensive. Therefore, Japanese Patent Application Publication No. JP-A-2005-90719 describes technology which eliminates this centrifugal hydraulic pressure canceller chamber by forming the secondary side cylinder with two hydraulic pressure chambers, i.e., an outer diameter side hydraulic pressure chamber and an inner diameter side hydraulic pressure chamber, and appropriately switching the cylinder pressure receiving area.

However, with the technology described in JP-A-2005-90719, a structure is necessary to switch between a mode that supplies hydraulic pressure to the inner diameter side hydraulic pressure chamber and discharges hydraulic pressure from the outer diameter side hydraulic pressure chamber, and a mode that supplies hydraulic pressure to the inner diameter side hydraulic pressure chamber and also supplies hydraulic pressure to the outer diameter side hydraulic pressure chamber. However, the required structure is rather complex. Also, the belt squeezing force does not change smoothly as the cylinder pressure receiving area, which is related to the switching of the modes, is switched.

SUMMARY OF THE INVENTION

This invention thus provides a vehicular belt-driven continuously variable transmission that is able to appropriately control belt squeezing force while having a simplified structure realized by eliminating a centrifugal hydraulic pressure canceller chamber on a secondary pulley side.

A first aspect of the invention relates to a vehicular belt-driven continuously variable transmission that includes a) a continuously variable transmitting portion into which rotation from a power source is input without a reduction in speed while a vehicle is traveling forward, and a single hydraulic pressure chamber provided for a secondary pulley, and b) a hydraulic pressure control apparatus that shifts the continuously variable transmitting portion by controlling one of i) the supply and discharge of the hydraulic fluid and ii) the pressure of the hydraulic fluid with respect to a primary side cylinder provided for a primary pulley, and adjusts belt squeezing force of a belt wound around the primary pulley and the secondary pulley by controlling the pressure supplied to a secondary side cylinder formed of the single hydraulic pressure chamber. c) The hydraulic pressure control apparatus is structured to control a line pressure and the pressure supplied to the secondary side cylinder independently.

Also, in the first aspect, a cylinder pressure receiving area of the secondary side cylinder may be set such that a safety factor, with respect to belt slip, of the belt squeezing force obtained when the pressure supplied to the second side cylinder is set to a predetermined lowest controllable pressure when the vehicle is traveling at maximum speed on a flat road, is a value less than or equal to 1.5.

Accordingly, although the belt squeezing force would become excessive at maximum speed due to increased thrust generated by centrifugal hydraulic pressure pushing the movable sheave in the direction that increases the belt squeezing force because no centrifugal hydraulic pressure canceller chamber is provided to cancel out that thrust, that belt squeezing force can be inhibited from becoming excessive by reducing the pressure receiving area of the secondary side cylinder. In this case, it is necessary to also reduce the pressure supplied to the secondary side cylinder. Regarding this point, controlling the line pressure and the pressure supplied to the secondary side cylinder independently makes it possible to avoid problems such as the line pressure, together with the pressure supplied to the secondary side cylinder, becoming too low, or not being able to shift to increase the speed due to the hydraulic pressure necessary for the shift not being supplied to the primary side cylinder or the like. Also, when the pressure receiving area of the secondary side cylinder is reduced, the line pressure must be increased to increase the hydraulic pressure supplied to the secondary side cylinder at low running speeds. However, if the line pressure can be controlled independently from the pressure supplied to the secondary side cylinder, an increase in the line pressure can be limited to roughly the speed reduction side ($\gamma > 1$) so adverse affects on practical fuel consumption can be avoided. Also, the cylinder pressure receiving area of the secondary side cylinder is reduced until the safety factor, with respect to belt slip, of the belt squeezing force obtained when the pressure supplied to the secondary side cylinder is set to the lowest pressure during maximum speed flat road running, in which the vehicle is running at maximum speed on a flat road, becomes a value less than or equal to 1.5, which makes it possible to keep the durability of the belt from declining. As a result, it is possible to provide a vehicular belt-driven continuously variable transmission having a simple structure and enabling the centrifugal hydraulic pressure canceller chamber to be eliminated for all practical purposes.

A second aspect of the invention relates to a control method of a vehicular belt-driven continuously variable transmission that includes a continuously variable transmitting portion into which rotation from a power source is input without a reduction in speed while a vehicle is traveling forward, and a single hydraulic pressure chamber provided for a secondary pulley. This control method is characterized by including a) shifting the continuously variable transmitting portion by controlling one of i) the supply and discharge of a hydraulic fluid and ii) the pressure of the hydraulic fluid with respect to a primary side cylinder provided for a primary pulley; and adjusting belt squeezing force of a belt, which is wound around the primary pulley and the secondary pulley, by adjusting the pressure supplied to a secondary side cylinder, which is formed of the single hydraulic pressure chamber, independently from performing one of i) control to supply and discharge of the hydraulic fluid and ii) control to adjust the pressure of the hydraulic fluid with respect to the primary side cylinder, wherein a cylinder pressure receiving area of the secondary side cylinder is set such that a safety factor, with respect to belt slip, of the belt squeezing force obtained when the pressure supplied to the second side cylinder is set to a predetermined lowest controllable pressure when the vehicle travels at maximum speed on a level road, is a value less than or equal to 1.5.

Accordingly, the centrifugal hydraulic pressure chamber may be eliminated for all practical purposes, thereby making it possible to provide a vehicular belt-driven continuously variable transmission with a simplified structure.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

Figure 1:
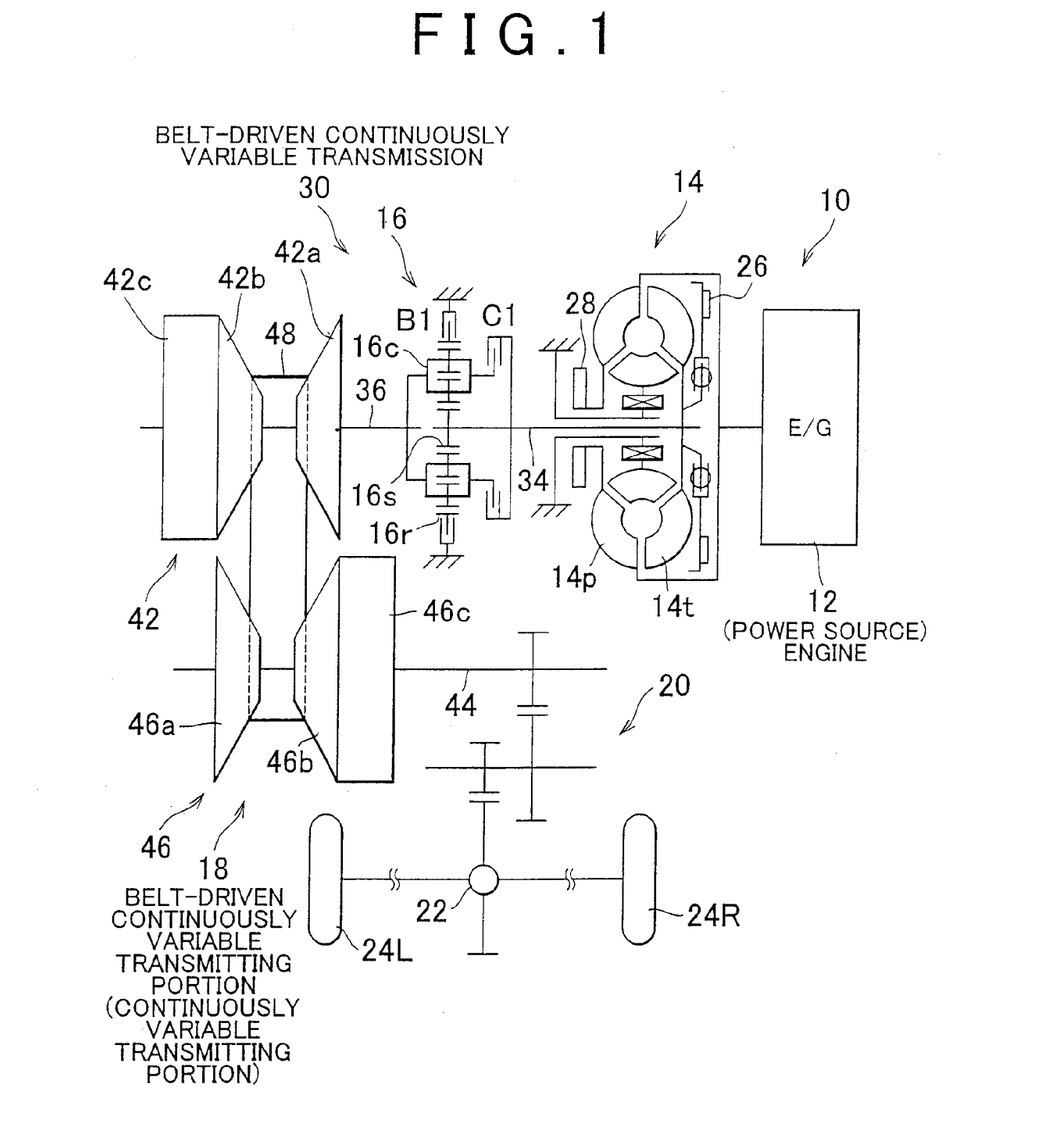
FIG. 1 is a skeleton view of a vehicular power transmitting device according to one example embodiment of the invention.

FIG. 1 is a skeleton view of a vehicular power transmitting device 10 according to one example embodiment of the invention. The vehicular power transmitting device 10 is an automatic transmission for a transverse mounted engine and may be employed in a FF (front engine, front drive) vehicle. The vehicular power transmitting device 10 includes an engine 12 that serves as a power source for running. Output from the engine 12, which is an internal combustion engine, is transmitted from a crankshaft of the engine 12 and a torque converter 14, which is a fluid coupling, to a final reduction gear 22 via a forward-reverse switching apparatus 16, an input shaft 36, a belt-driven continuously variable transmitting portion 18, and a reduction gear device 20, after which it is distributed to left and right driven wheels 24L and 24R. Here the forward-reverse switching apparatus 16 and the belt-driven continuously variable transmitting portion 18 together form a belt-driven continuously variable transmission 30. Incidentally, the belt-driven continuously variable transmitting portion 18 of this example embodiment may also be regarded as the continuously variable transmitting portion of the invention.

The torque converter 14 is designed to transfer power via fluid and includes a pump impeller 14p that is connected to the crankshaft of the engine 12, and a turbine runner 14t that is connected to the forward-reverse switching apparatus 16 via a turbine shaft 34. Also, a lockup clutch 26 is provided between the pump impeller 14p and the turbine runner 14t. Switching the supply of hydraulic pressure between an engage side hydraulic fluid chamber and the release side fluid chamber by a switching valve of a hydraulic pressure control apparatus, not shown, or the like engages or releases the lockup clutch 26. When the lockup clutch 26 is completely engaged, the pump impeller 14p and the turbine runner 14t rotate together as a single unit. A mechanical oil pump 28 is provided on the pump impeller 14p. This mechanical oil pump 28 generates hydraulic pressure used to control the shifting of the belt-driven continuously variable transmitting portion 18, apply belt squeezing force, and supply lubrication oil to various parts.

Figure 2:
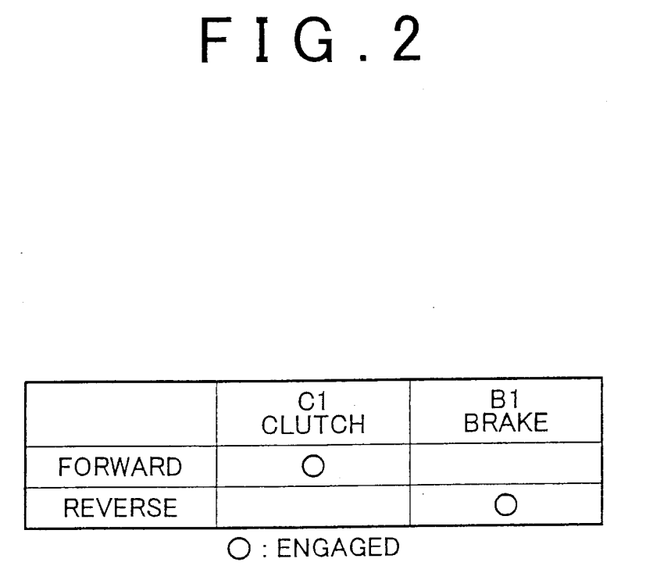
FIG. 2 is a clutch and brake application chart showing the operating states of the vehicular power transmitting device shown in FIG. 1.

The forward-reverse switching apparatus 16 includes a double pinion type planetary gear set as its main component. The turbine shaft 34 of the torque converter 14 is integrally connected to a sun gear 16s of the planetary gear set, an input shaft 36 of the belt-driven continuously variable transmitting portion 18 is integrally connected to a carrier 16c of the planetary gear set, and the carrier 16c and the sun gear 16s can be selectively connected together via a forward clutch C1. A ring gear 16r of the planetary gear set is selectively fixed to a housing via a reverse brake B1. The forward clutch C1 and the reverse brake B1 are both hydraulic friction engagement devices that are frictionally engaged by a hydraulic cylinder. As shown in FIG. 2, engaging the forward clutch C1 and releasing the reverse brake B1 results in the forward-reverse switching apparatus 16 rotating as a single unit, thus establishing a forward power transmission path such that forward rotation is transmitted to the belt-driven continuously variable transmitting portion 18 without a reduction in speed. On the other hand, by engaging the reverse brake B1 and releasing the forward clutch C1, a reverse power transmission path is established in the forward-reverse switching apparatus 16 so that the input shaft 36 rotates in a direction opposite that of the turbine shaft 34, which results in reverse rotation being transmitted to the belt-driven continuously variable transmitting portion 18. Also, releasing both the forward clutch C1 and the reverse brake B1 places the forward-reverse switching apparatus 16 in neutral (disconnected state), whereby the transmission of power is interrupted.

The belt-driven continuously variable transmitting portion 18 includes an input side variable pulley 42, an output side variable pulley 46, and a transmission belt 48. The input side variable pulley 42, provided on the input shaft 36, is an input side member with a variable effective diameter. The output side variable pulley 46, provided on the output shaft 44, is an output side member that also has a variable diameter. The transmission belt 48 serves as a power transmission member that is wound around, in frictional contact with, the variable pulleys 42 and 46 such that power is transmitted via frictional force between the transmission belt and the variable pulleys 42 and 46. The variable pulley 42 includes a fixed sheave 42a, a movable sheave 42b, and an input side hydraulic cylinder 42c. Similarly, the variable pulley 46 includes a fixed sheave 46a, a movable sheave 46b, and an output side hydraulic cylinder 46c. The fixed sheave 42a is fixed to the input shaft 36 while the fixed sheave 46a is fixed to the output shaft 44. The movable sheave 42b is provided on the input shaft 36 so as to be able to move in the axial direction but not rotate around its axis relative to the input shaft 36. Similarly, the movable sheave 46b is provided on the output shaft 44 so as to be able to move in the axial direction but not rotate its axis relative to the output shaft 44. The input side hydraulic cylinder 42c applies thrust that changes the V groove width between the fixed sheave 42a and the movable sheave 42b, while the output side hydraulic cylinder 46c applies thrust that changes the V groove width between the fixed sheave 46a and the movable sheave 46b. The speed ratio γ (i.e., speed ratio $\gamma = N_{IN}/N_{OUT}$ input shaft rotation speed $N_{IN}$/output shaft rotation speed $N_{OUT}$) is changed in a continuous fashion by changing the V groove widths of both movable pulleys 42 and 46, and thus the winding diameter (effective diameter) of the transmission belt 48 around those pulleys, which is done by controlling the hydraulic pressure in the input side hydraulic cylinder 42c of the input side variable pulley 42. Meanwhile, the squeezing force applied to the transmission belt 48 is changed by controlling the hydraulic pressure in the output side hydraulic cylinder 46c of the output side variable pulley 46. The transmission belt 48 is made of left and right steel bands 51, each of which is formed of a plurality of steel layers, which are fit into multiple metal pieces 49. Incidentally, the input side variable pulley 42 in this example embodiment may be regarded as the primary pulley of the invention and the output side variable pulley 46 may be regarded as the secondary pulley of the invention. Also, the input side hydraulic cylinder 42c of this example embodiment may be regarded as the primary side cylinder of the invention, the output side hydraulic cylinder 46c may be regarded as the secondary side cylinder of the invention, and the transmission belt 48 may be regarded as the belt of the invention.

Figure 3:
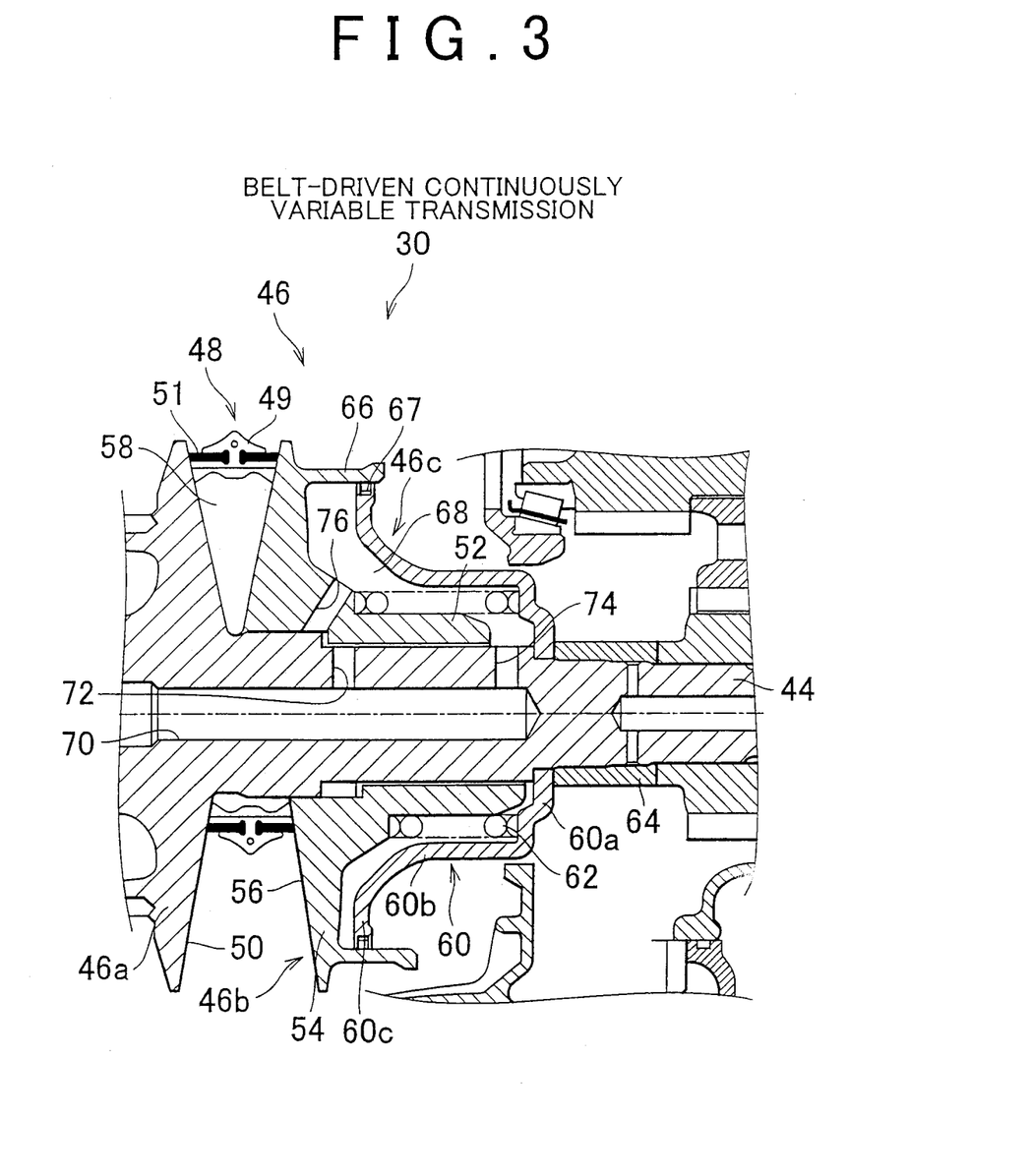
FIG. 3 is a sectional view showing part of the structure of an output side variable pulley, which is a constituent member of a belt-driven continuously variable transmission shown in FIG. 1.

FIG. 3 is a sectional view showing part of the structure of the output side variable pulley 46, which is a constituent member of the belt-driven continuously variable transmission 30 shown in FIG. 1. As described above, the output side variable pulley 46 includes the fixed sheave 46a, the movable sheave 46b, and the input side hydraulic cylinder 46c. The fixed sheave 46a is integrally formed with the output shaft 44 which is rotatably supported by bearings, not shown, at both ends. The movable sheave 46b is fitted onto the output shaft 44 so as to be able to move in the axial direction but not rotate around its axis relative to the output shaft 44. The output side hydraulic cylinder 46c is arranged on the opposite side of the movable sheave 46b from the fixed sheave 46a. The fixed sheave 46a is formed in a circular disc shape protruding in the radial direction and has a fixed side slope face 50 formed on the side opposing the movable sheave 46b. The movable sheave 46b includes a cylindrical portion 52 fitted onto the output shaft 44 and a disc-shaped flange portion 54 that protrudes in the radial direction from the end portion of the cylindrical portion 52. A plurality of grooves, not shown, extending in the axial direction are formed in the circumferential direction on both the inner peripheral surface of the cylindrical portion 52 and the outer peripheral surface of the output shaft 44. These grooves are aligned with each other, i.e., positioned such so as to always be at same phase in the circumferential direction, with ball bearings, not shown, being arranged extending between opposing grooves. Accordingly, the cylindrical portion 52 is able to move smoothly in the axial direction of the output shaft 44 via the ball bearings but is unable to rotate around the output shaft 44. Also, the flange portion 54 is integrally connected to the cylindrical portion 52 and has a movable side slope face 56 formed on the side opposing the fixed sheave 46a. The fixed side slope face 50 and movable side slope face 56 together form a V-shaped groove 58 in which the transmission belt 48 is wound. Here, the angle of inclination, or so-called flank angle, of the fixed side slope face 50 and the movable side slope face 56 is 11 degrees. Also, in FIG. 3, the portion above the axial center of the output shaft 44 is shown in a state in which the movable sheave 46b has been moved to a position closest to the fixed sheave 46a side such that the transmission belt 48 is positioned at the outer periphery of the groove 58, while the portion below the axial center of the output shaft 44 is shown in a state in which the movable sheave 46b has been moved to a position farthest from the fixed sheave 46a such that the transmission belt 48 is positioned at the inner periphery of the groove 58.

The output side hydraulic cylinder 46c includes a partition 60 fitted onto the output shaft 44 so as to be unable to move in the axial direction of the output shaft 44, the movable sheave 46b, and a spring 62 interposed between the partition 60 and the movable sheave 46b. The partition 60 is a cylindrical member, which has a closed bottom at one end, and is fitted onto the output shaft 44 so as to be unable to move in the axial direction relative to the output shaft 44. This partition 60 includes a first disc portion 60a that extends in the radial direction from the outer peripheral surface of the output shaft 44, a cylinder portion 60b that extends in the axial direction toward the movable sheave 46b from the outer peripheral end of the first disc portion 60a, and a second disc portion 60c that extends in the radial direction from one end of the cylinder portion 60b. The inner peripheral portion of the first disc portion 60a is sandwiched between a step portion formed on the output shaft 44 and a cylindrical spacer 64 fit around the outer peripheral surface of the output shaft 44, and is thus unable to move in the axial direction. An outer peripheral edge of the second disc portion 60c is sealed with an oil tight seal via a seal ring 67 against the inner peripheral surface of a cylindrical outer peripheral cylinder portion 66 provided on the flange portion 54 of the movable sheave 46b. Also, the spring 62 is interposed between the first disc portion 60a of the partition 60 and the flange portion 54 of the movable sheave 46b, which constantly applies thrust to move the movable sheave 46b toward the fixed sheave 46a. Here, a single hydraulic pressure chamber 68 is formed by the movable sheave 46b, the partition 60, and the output shaft 44. When a predetermined hydraulic pressure is supplied to this hydraulic pressure chamber 68, the hydraulic pressure moves the movable sheave 46b toward the fixed sheave 46a so that it squeezes the transmission belt 48 wound in the groove 58 in the axial direction.

An oil passage 70 that extends in the axial direction is formed inside the output shaft 44 and oil passages 72 and 74 are formed that extend from the oil passage 70 in the radial direction. Also, an oil passage 76 is formed that extends through from the inner periphery to the outer periphery of the cylindrical portion 52 of the movable sheave 46b. When hydraulic fluid is supplied to the oil passage 70 while the movable sheave 46b is in the state shown in the portion below the axial center in FIG. 3, that hydraulic fluid passes through the oil passage 72 as well as the oil passage 76 that is connected to the oil passage 72 and into the hydraulic pressure chamber 68. Thrust from the hydraulic pressure of this hydraulic fluid in addition to the elastic force of the spring 62 move the movable sheave 46b toward the fixed sheave 46a, thus squeezing the transmission belt in the axial direction. Also, when the movable sheave 46b moves into a predetermined position, the hydraulic pressure chamber 68 becomes communicated with the oil passage 74 so that hydraulic fluid is also supplied from this oil passage 74. The oil passage 70 is connected to a hydraulic pressure circuit 78 of a hydraulic pressure control apparatus 77, which will be described later.

Figure 4:
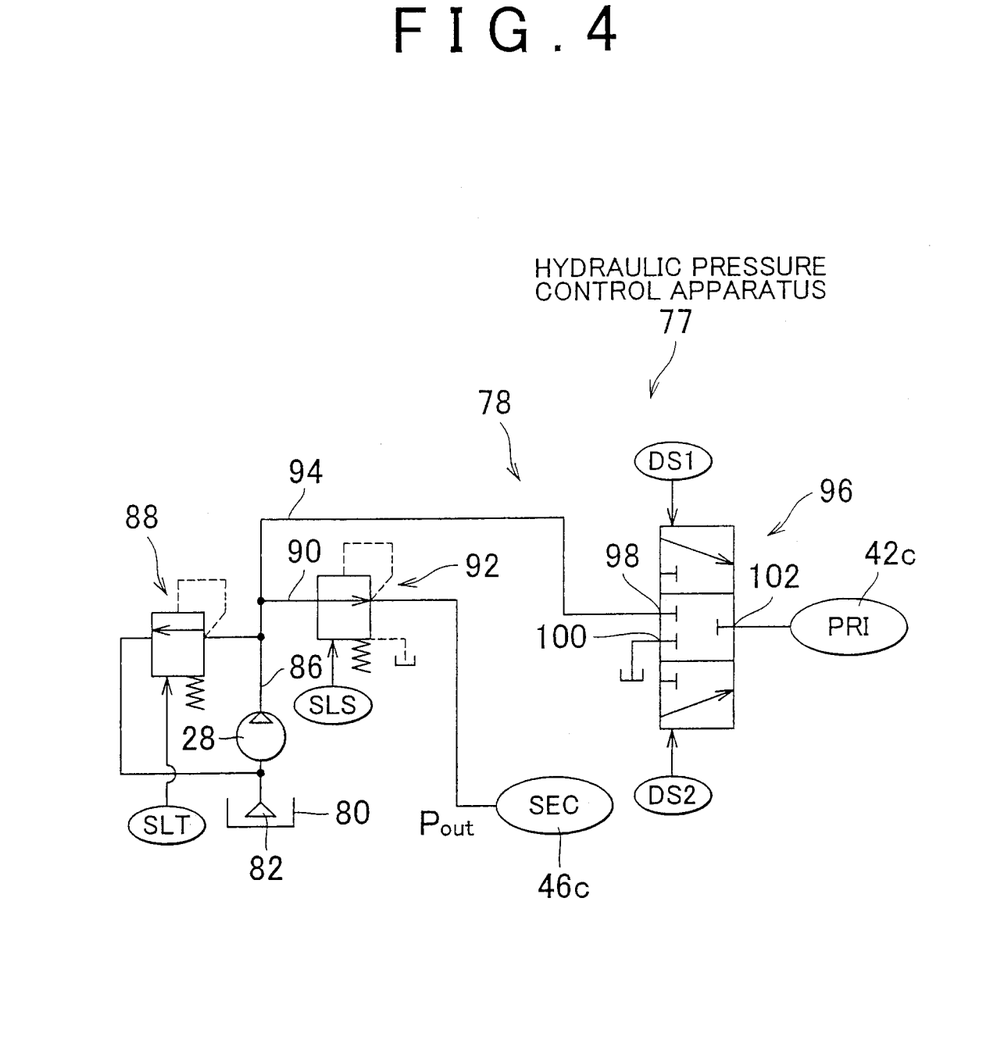
FIG. 4 is a circuit diagram of a hydraulic pressure circuit that forms a hydraulic pressure control apparatus, which supplies hydraulic fluid to the vehicular power transmitting device shown in FIG. 1.

FIG. 4 is the hydraulic pressure circuit 78 that forms the hydraulic pressure control apparatus 77 for supplying hydraulic pressure to the input side hydraulic cylinder 42c and the output side hydraulic cylinder 46c.

The hydraulic fluid drawn in from an oil pan 80 via a strainer 82 is pressurized by an oil pump 28 and then supplied to an oil passage 86. The pressure of the hydraulic fluid in the oil passage 86, i.e., the pump discharge pressure, is adjusted by a pressure regulating valve 88 that is controlled based on a signal hydraulic pressure output from a solenoid SLT. This adjusted pressure is the line pressure PL. When hydraulic fluid having this line pressure PL is supplied to an oil passage 90 that branches off from the oil passage 86, it is adjusted by a pressure-regulating valve 92 provided in the oil passage 90. The pressure-regulating valve 92 is controlled based on a signal hydraulic pressure output from a belt squeeze control solenoid SLS. The pressure adjusted hydraulic fluid passes through the oil passage 70 in the output shaft 44 and is supplied to the output side hydraulic cylinder 46c. Accordingly, the belt squeezing force on the transmission belt 48 wound around the input side variable pulley 42 and the output side variable pulley 46 can be adjusted by controlling the pressure of hydraulic fluid supplied to the output side hydraulic cylinder 46c.

On the other hand, hydraulic fluid supplied from the oil passage 86 to the oil passage 94 is supplied to a shift speed control valve 96. The shift speed control valve 96 is switched by a speed increase side solenoid DS1 and a speed decrease side solenoid DS2 to open and close communication between a line pressure supply port 98 and a drain port 100, and an output port 102 to the input side hydraulic cylinder 42c of the input side variable pulley 42. For example, when the speed increase side solenoid DS1 is on, communication is opened between the line pressure supply port 98 and the output port 102 such that the line pressure PL is supplied to the input side hydraulic cylinder 42c. On the other hand, when the speed decrease side solenoid DS2 is on, communication is opened between the output port 102 and the drain port 100 such that hydraulic fluid is discharged from the input side hydraulic cylinder 42c. By controlling the supply and discharge of hydraulic fluid to and from the input side hydraulic cylinder 42c in this way, the rotation radius of the transmission belt 48 that is wound around the input side variable pulley 42 is changed appropriately so the belt-driven continuously variable transmitting portion 18 shifts smoothly. Also, as described above, the line pressure in this example embodiment is controlled by the pressure regulating valve 88 via the solenoid SLT, and belt squeezing force control hydraulic pressure $P_{OUT}$ (MPa) supplied to the hydraulic pressure chamber 68 of the output side hydraulic cylinder 46c is controlled by the pressure regulating valve 92 via the belt squeeze control solenoid SLS. Both the line pressure and the belt squeezing force control hydraulic pressure $P_{OUT}$ (MPa) can be controlled independently. The various solenoid valves provided in the hydraulic pressure control apparatus 77 are preferably controlled by an electronic control unit based on various specifications provided by a vehicle speed sensor and an accelerator operation amount sensor and the like, not shown.

In this example embodiment, the centrifugal hydraulic pressure canceller chamber 214 shown in FIG. 6 described above is eliminated. Typically when a centrifugal hydraulic pressure canceller chamber is not provided, the belt squeezing force applied to the transmission belt 48 becomes excessive when the vehicle travels at high speeds due to the centrifugal hydraulic pressure generated in the hydraulic pressure chamber 68 shown in FIG. 3. Here, a safety factor K is used as an index, with respect to belt slip, of the belt squeezing force applied to the transmission belt 48. This safety factor K is calculated according to Expression (1) below, for example, which is well known.

$$K=\{(P_{OUT}+\beta V^2)S_{OUT}+W\}/(T_{\cos}\theta/(D\mu))\quad(1)$$

Here, $P_{OUT}$ (MPa) represents the belt squeezing force control hydraulic pressure, i.e., the belt tension control hydraulic pressure, supplied to the hydraulic pressure chamber 68 of the output side hydraulic cylinder 46c. β represents the centrifugal hydraulic pressure coefficient (MPa/(km/h)$^2$) of the output side hydraulic cylinder 46c, V (km/h) represents the vehicle speed, $S_{OUT}$ (mm$^2$) represents the pressure receiving area of the hydraulic pressure chamber 68, W (N) represents the load of the spring 62, T (Nm) represents the transfer torque, θ (rad) represents the flank angle of the fixed and movable sheaves 46a and 46b, D (m) represents the winding diameter of the transmission belt 48 on the input side variable pulley 42 side, and μ represents the coefficient of friction between the transmission belt 48 and the output side variable pulley 46.

If the safety factor K falls below 1.0, the transmission belt 48 will slip with respect to the output side variable pulley 46. On the other hand, as the safety factor K increases beyond 1.0, the belt squeezing force applied to the transmission belt 48 becomes excessive, thereby reducing the durability of the transmission belt 48 and reducing belt efficiency. In this case, although there is some variation in the friction coefficient due to the tolerance of the transmission belt 48, the safety factor K is typically set somewhere within the range of 1.0 to 1.5, inclusive, for example, and preferably in the range of 1.2 to 1.5, inclusive.

Figure 5:
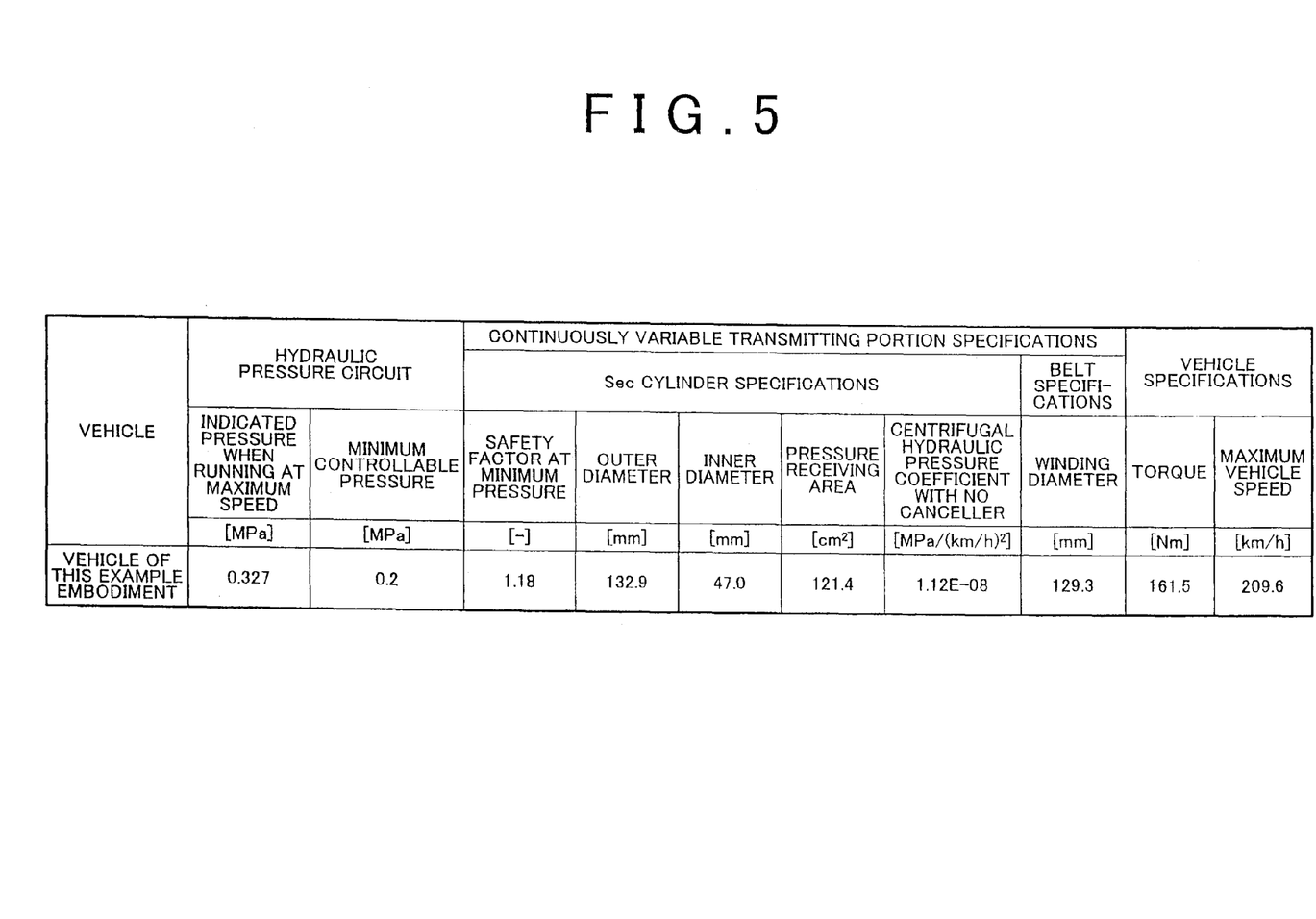
FIG. 5 is a table listing safety factor calculation results of a vehicle to which the example embodiment has been applied, and the various parameters used in that calculation.

Here, in this example embodiment, even if the centrifugal hydraulic pressure canceller chamber of the output side variable pulley 46 is not provided, the belt squeezing force control hydraulic pressure $P_{OUT}$ and the cylinder pressure receiving area $S_{OUT}$ of the hydraulic pressure chamber 68 are set so that the safety factor K falls within the aforementioned range. FIG. 5 is a table listing the calculated results of the safety factor $K_0$ in a vehicle in this example embodiment, and the various parameters used in that calculation. The safety factor $K_0$ is calculated while the lowest predetermined pressure that the pressure regulating valve 92 is able to control the belt squeezing force control hydraulic pressure $P_{OUT}$ to (hereinafter also referred to as the "lowest controllable pressure") is supplied to the hydraulic pressure chamber 68 of the output side hydraulic cylinder 46c during maximum speed flat road running, i.e., when the vehicle is traveling at maximum speed on a flat road, which is when the affect from centrifugal hydraulic pressure is greatest.

The safety factor $K_0$ of the vehicle in this example embodiment is set at 1.18, for example. In this case, the safety factor K is a value below 1.5.

Also, the indicated pressure of the belt squeezing force control hydraulic pressure $P_{OUT}$ of the hydraulic pressure chamber 68 of the output side hydraulic cylinder 46c during maximum speed flat road running shown in FIG. 5 is 0.327 (MPa), which is above the lowest controllable pressure of 0.2 (MPa). Here, this calculated indicated pressure is calculated assuming that the safety factor K is 1.3 and is thus a hydraulic pressure required to make the safety factor K 1.3. Incidentally, the friction coefficient μ is typically approximately 0.08 to 0.10. In this calculation, the friction coefficient μ is set to be 0.09. Also, the lowest controllable pressure is set based on the specifications of the hydraulic pressure control system provided in each vehicle.

In order to achieve the foregoing safety factor $K_0$ and indicated pressure, in the vehicle in this example embodiment, the cylinder pressure receiving area $S_{OUT}$ of the hydraulic pressure chamber 68 of the output side hydraulic cylinder 46c is set small. In the vehicle in this example embodiment, this pressure receiving area $S_{OUT}$ is set to 121.4 (cm$^2$). Incidentally, the cylinder pressure receiving area $S_{OUT}$ is set so that the safety factor K does not fall below 1.0 in the context of the maximum transfer torque and the maximum controllable pressure when the vehicle is stopped. Setting the pressure receiving area $S_{OUT}$ small also results in a smaller centrifugal hydraulic pressure coefficient so the safety factor K becomes smaller according to Expression (1). When the pressure receiving area is set small, the line pressure PL required to generate a predetermined belt squeezing force increases, which may adversely affect efficiency due to the increased load on the oil pump 28. On the other hand, the hydraulic pressure circuit is provided in which the line pressure PL in this example embodiment is regulated by the solenoid SLT and the pressure regulating valve 88, and the belt squeezing force control hydraulic pressure $P_{OUT}$ supplied to the hydraulic pressure chamber 68 of the output side hydraulic cylinder 46c is regulated by the belt squeeze control solenoid SLS and the pressure regulating valve 92. Because the line pressure PL and the belt squeezing force control hydraulic pressure $P_{OUT}$ may be regulated separately, an increase in the line pressure PL can be kept to a minimum. That is, an increase in the line pressure PL is limited to the speed reduction range (speed ratio γ>1.0) where the hydraulic pressure supplied to the output side hydraulic cylinder 46c becomes higher than the hydraulic pressure supplied to the input side hydraulic cylinder 42c, and thus limited to times such as during take-off from a standstill or a kickdown while traveling at low speeds. Therefore, by keeping an increase in the line pressure PL to a minimum, an adverse affect on the practical fuel consumption is inhibited.

Also in the vehicle in this example embodiment, the lowest controllable pressure is set low. More specifically, in the vehicle in this example embodiment, the lowest controllable pressure is 0.2 (MPa), as shown in FIG. 5. Accordingly, the indicated pressure of the vehicle in this example embodiment of 0.327 (MPa) exceeds 0.2 (MPa), meaning that it can be controlled. When air enters the hydraulic pressure chamber 68 when the hydraulic pressure in the hydraulic pressure chamber 68 of the output side hydraulic cylinder 46c is drained, the responsiveness when hydraulic pressure is supplied decreases. So, it is necessary to apply the hydraulic pressure required to fill the hydraulic pressure chamber 68 with hydraulic fluid. The required hydraulic pressure is the lowest controllable pressure, but in this example embodiment a hydraulic pressure control valve that controls the pressure to an extremely low pressure is provided to lower the lowest pressure. Also, control to reduce the variation in the control valve, such as the hydraulic pressure learning using the hydraulic pressure sensor or the like, is performed.

Also in the vehicle in this example embodiment, in order to keep the centrifugal hydraulic pressure to a minimum, the rotational speed of the output side variable pulley 46 is set relatively low. In a structure such as that of the vehicle in this example embodiment in which rotation from the engine 12 is input to the belt-driven continuously variable transmitting portion 18 without a reduction in speed, and in which the reduction gear device 20 is arranged after the belt-driven continuously variable transmitting portion 18, the rotation speed of the output side variable pulley 46 with respect to the vehicle speed is determined by the reduction gear ratio of that reduction gear, device 20 and the tire radius. Accordingly, the rotation speed may be reduced by decreasing the reduction gear ratio or increasing the tire radius.

Further, in the vehicle in this example embodiment, an engine 12 is used that can generate relatively large transfer torque T. As a result, the safety factor K can be set low. Taking all of these factors into account, the safety factor K can be kept down to the safety factor $K_0$ described above, and a pressure equal to or greater than the lowest controllable pressure can always be maintained.

Accordingly, although the belt squeezing force would become excessive at maximum speed due to increased thrust generated by centrifugal hydraulic pressure pushing the movable sheave 46b of the output side movable pulley 46 in the direction that increases the belt squeezing force because no centrifugal hydraulic pressure canceller chamber is provided to cancel out that thrust, according to the belt-driven continuously variable transmission 30 of this example embodiment, the belt squeezing force is inhibited from becoming excessive by reducing the pressure receiving area $S_{OUT}$ of the output side hydraulic cylinder 46c. In this case, it is necessary to also reduce the pressure supplied to the output side hydraulic cylinder 46c. Regarding this point, controlling the line pressure PL and the belt squeezing force control hydraulic pressure $P_{OUT}$ in the output side hydraulic cylinder independently makes it possible to avoid problems such as the line pressure PL, together with the belt squeezing force control hydraulic pressure $P_{OUT}$ in the output side hydraulic cylinder 46c, becoming too low, or not being able to shift to increase the speed due to the hydraulic pressure necessary to shift the belt-driven continuously variable transmitting portion 18 not being supplied to the input side hydraulic cylinder 42c or the like. Also, when the pressure receiving area $S_{OUT}$ of the output side hydraulic cylinder 46c is reduced, the line pressure PL must be increased to increase the hydraulic pressure supplied to the output side hydraulic cylinder 46c when the vehicle is traveling at low speeds. However, if the line pressure PL can be controlled independently from the belt squeezing force control hydraulic pressure $P_{OUT}$ in the output side hydraulic cylinder 46c, an increase in the line pressure PL can be limited to roughly the speed reduction range ($\gamma > 1$) so adverse affects on practical fuel consumption can be avoided. Also, the cylinder pressure receiving area $S_{OUT}$ of the output side hydraulic cylinder 46c is reduced until the safety factor, with respect to belt slip, of the belt squeezing force obtained when the pressure supplied to the output side hydraulic cylinder 46c is set to the lowest pressure during maximum speed flat road running, in which the vehicle is running at maximum speed on a flat road, becomes a value less than or equal to 1.5, which makes it possible to keep the durability of the belt from declining. As a result, the centrifugal hydraulic pressure canceller chamber can be eliminated for all practical purposes, while avoiding the problems of the related art described above.

Also, the belt-driven continuously variable transmission 30 of this example embodiment is lighter, more compact, and less expensive because the centrifugal hydraulic pressure canceller chamber is eliminated. Also, there is no need for the hydraulic fluid that was supplied to the centrifugal hydraulic pressure canceller chamber so the volume of the oil pump 28 can be reduced.

Continuing on, another example embodiment of the invention will now be described. Parts in this example embodiment that are the same as parts in the example embodiment described above will be denoted by the same reference characters and descriptions thereof will be omitted.

Figure 7:
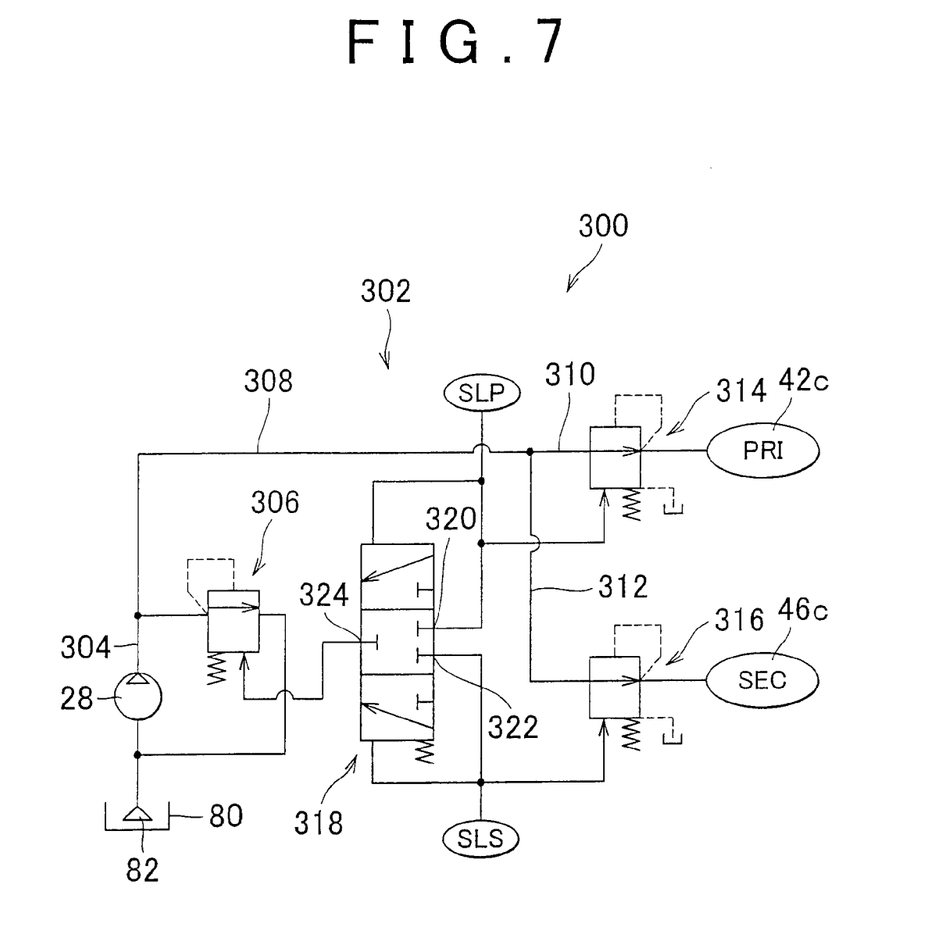
FIG. 7 is a circuit diagram of a hydraulic pressure circuit that forms a hydraulic pressure control apparatus according to another example embodiment of the invention.

FIG. 7 is a circuit diagram of a hydraulic pressure circuit 302 that forms a hydraulic pressure control apparatus 300 according to another example embodiment of the invention. The structure aside from the hydraulic pressure control apparatus 300 is the same as it is in the vehicular power transmitting device 10 described above so a description thereof will be omitted.

The hydraulic fluid drawn in from the oil pan 80 via the strainer 82 is pressurized by the oil pump 28 and then supplied to an oil passage 304. The pressure of the hydraulic fluid in the oil passage 304, i.e., the pump discharge pressure, is adjusted by a pressure-regulating valve 306. The adjusted pressure is the line pressure PL. The hydraulic fluid having this line pressure PL is supplied to oil passages 310 and 312 that branch off from a branching point in the oil passage 308. The pressure of hydraulic fluid supplied to the oil passage 310 is adjusted by a pressure-regulating valve 314. The pressure-regulating valve 314 is controlled based on a signal hydraulic pressure output from an input side hydraulic pressure control solenoid SLP. The pressure adjusted hydraulic fluid is then supplied to the input side hydraulic cylinder 42c of the input side variable pulley 42.

On the other hand, the pressure of the hydraulic fluid supplied to the oil passage 312 is adjusted by a pressure-regulating valve 316. The pressure regulating valve 316 is controlled based on a signal hydraulic pressure output from an output side hydraulic pressure control solenoid SLS. The pressure adjusted hydraulic fluid is then supplied to the output side hydraulic cylinder 46c of the output side variable pulley 46.

Also, the signal hydraulic pressures output from the input side hydraulic pressure control solenoid SLP and the output side hydraulic pressure control solenoid SLS are input to a three-way switching valve 318. This three-way switching valve 318 is switched by the input side hydraulic pressure control solenoid SLP and the output side hydraulic pressure control solenoid SLS to open and close communication between a first input port 320 and a second input port 322, and an output port 324. For example, when the input side hydraulic pressure control solenoid SLP is on, communication is opened between the first input port 320 and the output port 324 such that the signal hydraulic pressure of the input side hydraulic pressure control solenoid SLP is input as the pilot pressure of the pressure regulating valve 306. On the other hand, when the output side hydraulic pressure control solenoid SLS is on, communication is opened between the second input port 322 and the output port 324 such that the signal hydraulic pressure of the output side hydraulic pressure control solenoid SLS is input as the pilot pressure of the pressure regulating valve 306. Accordingly, the line pressure PL is controlled according to the magnitude relation between the signal hydraulic pressures of the input side hydraulic pressure control solenoid SLP and the output side hydraulic pressure control solenoid SLS, and a higher hydraulic pressure is supplied to the pressure regulating valve 306. Also, the pressure-regulating valve 306 is controlled by the higher hydraulic pressure to regulate the line pressure PL. On the other hand, the belt squeezing force control hydraulic pressure $P_{OUT}$ supplied to the hydraulic pressure chamber 68 of the output side hydraulic cylinder 46c is regulated by the pressure regulating valve 316 via the output side hydraulic pressure control solenoid SLS, thus the line pressure PL and the belt squeezing force control hydraulic pressure $P_{OUT}$ are able to be controlled independently.

This kind of hydraulic pressure circuit 302 is also able to achieve the same effects as those achieved in the example embodiment described above, and thus enables the centrifugal hydraulic pressure canceller chamber to be eliminated for all practical purposes.

Heretofore, example embodiments of the invention have been described in detail with reference to the accompanying drawings. Other example embodiments of the invention are also possible.

For example, in the hydraulic pressure circuits 78 and 302 in the foregoing example embodiments, the line pressure PL and the belt squeezing force control hydraulic pressure $P_{OUT}$, supplied to the hydraulic pressure chamber 68 of the output side variable pulley 46, may be controlled independently. However, as long as the hydraulic pressures are independently controllable, the invention may also be applied to a hydraulic pressure circuit having another structure.

Also, in these example embodiments, the belt-driven continuously variable transmitting portion 18 is shifted by controlling the supply and discharge of hydraulic pressure to and from the input side hydraulic cylinder 42c. However, the invention may also be applied to a structure in which a belt-driven continuously variable transmitting portion is shifted by controlling the pressure of the hydraulic fluid supplied to the input side hydraulic cylinder 42c.

Also, the vehicular power transmitting device 10 in these example embodiments is applied to an FF (front engine, front drive) type vehicle, but the invention may also be applied to another type of vehicle such as a four-wheel-drive vehicle. Further, the structure and the like of the forward-reverse switching apparatus 16 may be freely modified in a manner consistent with the scope of invention.

While the invention has been described with reference to example embodiments thereof, it is to be understood that the invention is not limited to the described embodiments or constructions. To the contrary, the invention is intended to cover various modifications and equivalent arrangements. In addition, while the various elements of the described embodiments are shown in various example combinations and configurations, other combinations and configurations, including more, less or only a single element, are also within the spirit and scope of the invention.

The invention claimed is:

1. A method of controlling a vehicular belt-driven continuously variable transmission for use in a vehicle traveling at speeds up to a maximum speed, the belt-driven continuously variable transmission including a continuously variable transmitting portion into which rotation from a power source is input without a reduction in speed while a vehicle is traveling forward, and a single hydraulic pressure chamber provided for a secondary pulley, the method comprising:
   shifting the continuously variable transmitting portion by controlling one of i) the supply and discharge of a hydraulic fluid and ii) the pressure of the hydraulic fluid with respect to a primary side cylinder provided for a primary pulley; and
   adjusting belt squeezing force of a belt, which is wound around the primary pulley and the secondary pulley, by adjusting the pressure supplied to a secondary side cylinder, which is formed of the single hydraulic pressure chamber, independently from performing one of i) control to supply and discharge of the hydraulic fluid and ii) control to adjust the pressure of the hydraulic fluid with respect to the primary side cylinder,
   wherein performing the control to adjust the pressure of the hydraulic fluid includes adjusting a first pressure regulating valve and wherein adjusting the pressure supplied to the secondary side cylinder includes adjusting a second pressure regulating valve; and
   wherein a cylinder pressure receiving area of the secondary side cylinder is set such that a safety factor, with respect to belt slip, of the belt squeezing force obtained when the pressure supplied to the second side cylinder is set to a predetermined lowest controllable pressure when the vehicle travels at maximum speed on a flat road, is a value less than or equal to 1.5.

2. The method of controlling a vehicular belt-driven continuously variable transmission according to claim 1, wherein performing the control to supply and discharge of the hydraulic fluid includes adjusting a shift speed control valve.

3. The method of controlling a vehicular belt-driven continuously variable transmission according to claim 1, wherein when the speed of the vehicle is increased, the line pressure is supplied to the primary side cylinder.

4. A vehicular belt-driven continuously variable transmission for use in a vehicle traveling at speeds up to a maximum speed, the belt-driven continuously variable transmission comprising:
   a continuously variable transmitting portion into which rotation from a power source is input without a reduction in speed while a vehicle is traveling forward;
   a single hydraulic pressure chamber provided for a secondary pulley; and
   a hydraulic pressure control apparatus that is configured to shift the continuously variable transmitting portion and configured to adjust a belt squeezing force of a belt, which is wound around a primary pulley and the secondary pulley;
   wherein the hydraulic pressure control apparatus shifts the continuously variable transmitting portion by controlling one of i) the supply and discharge of a hydraulic fluid and ii) the pressure of the hydraulic fluid with respect to a primary side cylinder provided for the primary pulley,
   wherein the hydraulic pressure control apparatus adjusts the belt squeezing force of the belt by controlling the pressure supplied to a secondary side cylinder formed of the single hydraulic pressure chamber,
   wherein the hydraulic pressure control apparatus controls a line pressure and the pressure supplied to the secondary side cylinder independently, the hydraulic pressure control apparatus including a first pressure regulating valve configured to control the line pressure and a second pressure regulating valve configured to control the pressure supplied to the secondary side cylinder, and
   wherein a cylinder pressure receiving area of the secondary side cylinder is set such that a safety factor, with respect to belt slip, of the belt squeezing force obtained when the pressure supplied to the second side cylinder is set to a predetermined lowest controllable pressure when the vehicle travels at maximum speed on a flat road, is a value less than or equal to 1.5.

5. The vehicular belt-driven continuously variable transmission according to claim 4, wherein the cylinder pressure receiving area of the secondary side cylinder is set such that the safety factor, with respect to belt slip, of the belt squeezing force obtained when the pressure supplied to the second side cylinder is set to the predetermined lowest controllable pressure when the vehicle travels at maximum speed on a flat road, is a value between 1.0 and 1.5, inclusive.

6. The vehicular belt-driven continuously variable transmission according to claim 5, wherein the cylinder pressure receiving area of the secondary side cylinder is set such that the safety factor, with respect to belt slip, of the belt squeezing force obtained when the pressure supplied to the second side cylinder is set to the predetermined lowest controllable pressure when the vehicle travels at maximum speed on a flat road, is a value between 1.2 and 1.5, inclusive.

7. The vehicular belt-driven continuously variable transmission according to claim 4, wherein the hydraulic pressure control apparatus further includes a shift speed control valve.

8. The vehicular belt-driven continuously variable transmission according to claim 4, wherein when the speed of the vehicle is increased, the line pressure is supplied to the primary side cylinder.

* * * * *